US011068506B2

(12) United States Patent
Lee et al.

(10) Patent No.: US 11,068,506 B2
(45) Date of Patent: Jul. 20, 2021

(54) SELECTIVE DISPATCHING OF OLAP REQUESTS USING EXECUTION STATISTICS

(71) Applicant: SAP SE, Walldorf (DE)

(72) Inventors: Chul Won Lee, Seoul (KR); Jeong Hee Won, Yongin (KR); Jaeyoung Choi, Seoul (KR); Nosub Sung, Seoul (KR)

(73) Assignee: SAP SE, Walldorf (DE)

( * ) Notice: Subject to any disclaimer, the term of this patent is extended or adjusted under 35 U.S.C. 154(b) by 398 days.

(21) Appl. No.: 15/150,815

(22) Filed: May 10, 2016

(65) Prior Publication Data

US 2017/0329835 A1    Nov. 16, 2017

(51) Int. Cl.
| | | |
|---|---|---|
| *G06F 16/28* | (2019.01) | |
| *G06F 9/50* | (2006.01) | |
| *G06F 9/46* | (2006.01) | |
| *G06F 16/2455* | (2019.01) | |

(52) U.S. Cl.
CPC ............ *G06F 16/283* (2019.01); *G06F 9/466* (2013.01); *G06F 9/5083* (2013.01); *G06F 16/2455* (2019.01)

(58) Field of Classification Search
CPC .. G06F 17/30592; G06F 9/466; G06F 9/5083; G06F 17/30477
USPC ........................................................ 707/602
See application file for complete search history.

(56) References Cited

U.S. PATENT DOCUMENTS

| | | | | |
|---|---|---|---|---|
| 7,640,249 B2 | 12/2009 | Smits | | |
| 7,958,159 B1* | 6/2011 | Tran | .................. | G06F 17/30507 707/634 |
| 10,423,644 B1* | 9/2019 | Leach | ................... | G06F 9/5083 |
| 2014/0101091 A1* | 4/2014 | Brown | .............. | G06F 17/30342 707/602 |
| 2015/0149745 A1 | 5/2015 | Eble et al. | | |
| 2015/0379077 A1 | 12/2015 | Grosse et al. | | |
| 2016/0048584 A1 | 2/2016 | Valentin | | |
| 2016/0171070 A1* | 6/2016 | Hrle | ...................... | G06F 16/273 707/615 |
| 2016/0196163 A1* | 7/2016 | van Gulik | ........... | G06F 16/2379 718/102 |
| 2016/0203050 A1* | 7/2016 | Hrle | ...................... | G06F 16/275 707/625 |

(Continued)

OTHER PUBLICATIONS

"An insight into SAP HANA Architecture", *SapHanaTutorial*, <http://saphanatutorial.com/an-insight-into-sap-hana-architecture/> (retrieved Apr. 7, 2016).

(Continued)

*Primary Examiner* — Pierre M Vital
*Assistant Examiner* — Alicia M Antoine
(74) *Attorney, Agent, or Firm* — Klarquist Sparman, LLP

(57) ABSTRACT

Technologies are described for facilitating transaction processing within a database environment that includes one or more processing units and a memory. A request for a database operation, such as a query, is received from a client. Execution statistics associated with the request are retrieved. At least some of the execution statistics are compared with one or more threshold values. Based on results of the comparing, the request is carried out with a first execution component or delegated to a second execution component. The request is executed and execution results are sent to the client.

20 Claims, 10 Drawing Sheets

(56) References Cited

U.S. PATENT DOCUMENTS

2016/0253403 A1* 9/2016 Marin ................. G06F 16/283
                                                    707/605
2017/0329836 A1* 11/2017 Simitsis ............ G06F 17/30592
2018/0039674 A1*  2/2018 Seyvet ............. G06F 17/30516

OTHER PUBLICATIONS

Kemper et al., "CH-benCHmark", *Technische Universitat Munchen*, <https://db.in.tum.de/research/projects/CHbenCHmark/> (retrieved Mar. 28, 2016).

Farber et al., "The SAP HANA Database—An Architecture Overview", *IEEE Computer Society, Bulletin of the Technical Committee of Data Engineering*, 35(1):28-33 (Mar. 2012).

Vasudevan, Sabarish, "OLAP vs OLTP", *Basisdomain*, <https://basisdomain.wordpress.com/2013/03/26/olap-vs-oltp/> (retrieved Mar. 28, 2016), Mar. 26, 2013.

* cited by examiner

SELECTIVE DISPATCHING OF OLAP REQUESTS USING EXECUTION STATISTICS

FIELD

The present disclosure generally relates to processing workload elements, such as requests for database operations, in a database environment. Particular implementations relate to dispatching of requests to first or second execution components depending on execution statistics associated with the request.

BACKGROUND

Increasingly, single database systems are used to simultaneously process online transaction processing (OLTP) requests needed for business operations and online analytical processing (OLAP) requests related to data analysis and business planning. While OLTP requests typically execute quickly, OLAP requests can take much longer to complete. If too many system resources are used processing OLAP requests, the execution time of OLTP requests can be significantly affected, which, apart from affecting database performance, can practically affect the operation of a business. This situation may occur even though the load on the processors of the database system may be comparatively low.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating the processing of requests for database operations. A request for a database operation, such as a query, is received by a component of a database system. In some cases, the component of the database system determines whether the request is of a particular type, such as a query or a transaction control statement (e.g., a commit operation or a rollback operation). If the request is of a first type, such as a transaction control statement, the component of the database system may determine that the request should be carried out by a first execution component. The first execution component can be, for example, a query language execution thread.

In other cases, such as if the request is determined not to be of the first type, execution statistics associated with the request can be retrieved. For example, if the request has previously been carried out on the database system, execution statistics associated with the prior execution of the request can be retrieved. In a particular example, at least a portion of the execution statistics can be associated with a stored execution plan for the request. If the request has not been previously carried out, a prospective execution plan for the request can be generated. The prospective execution plan can include execution statistics, such as estimated or calculated execution statistics. In a further example, the request can be determined to be of a particular type, and execution statistics for the type can be retrieved.

Execution statistics can include information regarding execution duration for the request, number of threads used in executing the request, a number of parallel operations associated with executing the request, and a number of remote calls made in executing the request. At least some of the execution statistics can be compared with one or more threshold values. In some cases, when multiple execution statistics, each with a threshold value, are compared, the comparison can be weighted. For example, the weighting can be related to the impact of the particular execution statistic on execution time of the request.

Based on results of the comparing, the request can be carried out by a first execution component or delegated to a second execution component. For example, if, during the comparing, it is determined that a threshold or thresholds are exceeded, the request can be delegated to a second execution component, such as a job execution thread. In some cases, the second execution component can execute multiple operations of the request in parallel, such as using multiple job execution threads. If the threshold or thresholds are not exceeded, the request can be carried out by the first execution component, such as a query language execution thread. In a particular aspect, execution statistics used in the comparing, or the threshold values, are user-configurable.

The request is executed by the selected execution component. After the request is executed, execution results can be returned to the client. In a particular example, the execution results are returned to the client by the execution component which executed the request. In a particular aspect, the execution results can be encoded before being returned to the client. For example, the execution results can be encoded by the execution component which executed the request.

The method can include additional steps. For example, the method can include measuring the execution statistics during execution of the request. In some cases, the execution statistics are measured by components of the database system responsible for carrying out the request. The measured execution statistics, in one implementation, can be used to generate or update the execution statistics, such as in an execution plan, associated with the request. The method can also include storing execution statistics, including measured execution statistics.

In some embodiments, a method including the comparing and selecting of a first or second execution component to carry out the request can be selectively enabled. For example, under certain circumstances, such as comparatively low processor usage by the database system, or delayed processing of at least certain types of requests, the method can be enabled. Under other conditions, such as when there is comparatively high processor usage by the database system, or a comparatively low number of long-running requests, the method can be disabled.

The present disclosure also includes computing systems and tangible, non-transitory computer readable storage media configure to carry out, or including instructions for carrying out, an above-described method. As described herein, a variety of other features and advantages can be incorporated into the technologies as desired.

DETAILED DESCRIPTION

Example 1—Overview

Database systems commonly operate using online transaction processing (OLTP) workloads, which are typically transaction-oriented, or online analytical processing (OLAP) workloads, which typically involve data analysis. OLTP transactions are commonly used for core business functions, such as entering, manipulating, or retrieving operational data, and users typically expect transactions or queries to be completed quickly. For example, OLTP transactions can include operations such as INSERT, UPDATE, and DELETE, and comparatively simple queries. OLAP workloads typically involve queries used for enterprise resource planning and other types of business intelligence. OLAP workloads commonly perform few, if any, updates to database records, rather, they typically read and analyze past transactions, often in large numbers. Because OLAP processes can involve complex analysis of a large number of records, they can require significant processing time.

Modern database systems often provide the ability to perform both OLTP and OLAP operations concurrently on a single system. While this can be beneficial for users, and may reduce maintenance efforts compared with maintaining multiple systems, mixed OLTP and OLAP workloads can affect performance of the database system. For example, OLAP workloads can delay processing of OLTP transactions, which can impact response time, and ultimately business operations.

Figure 1:
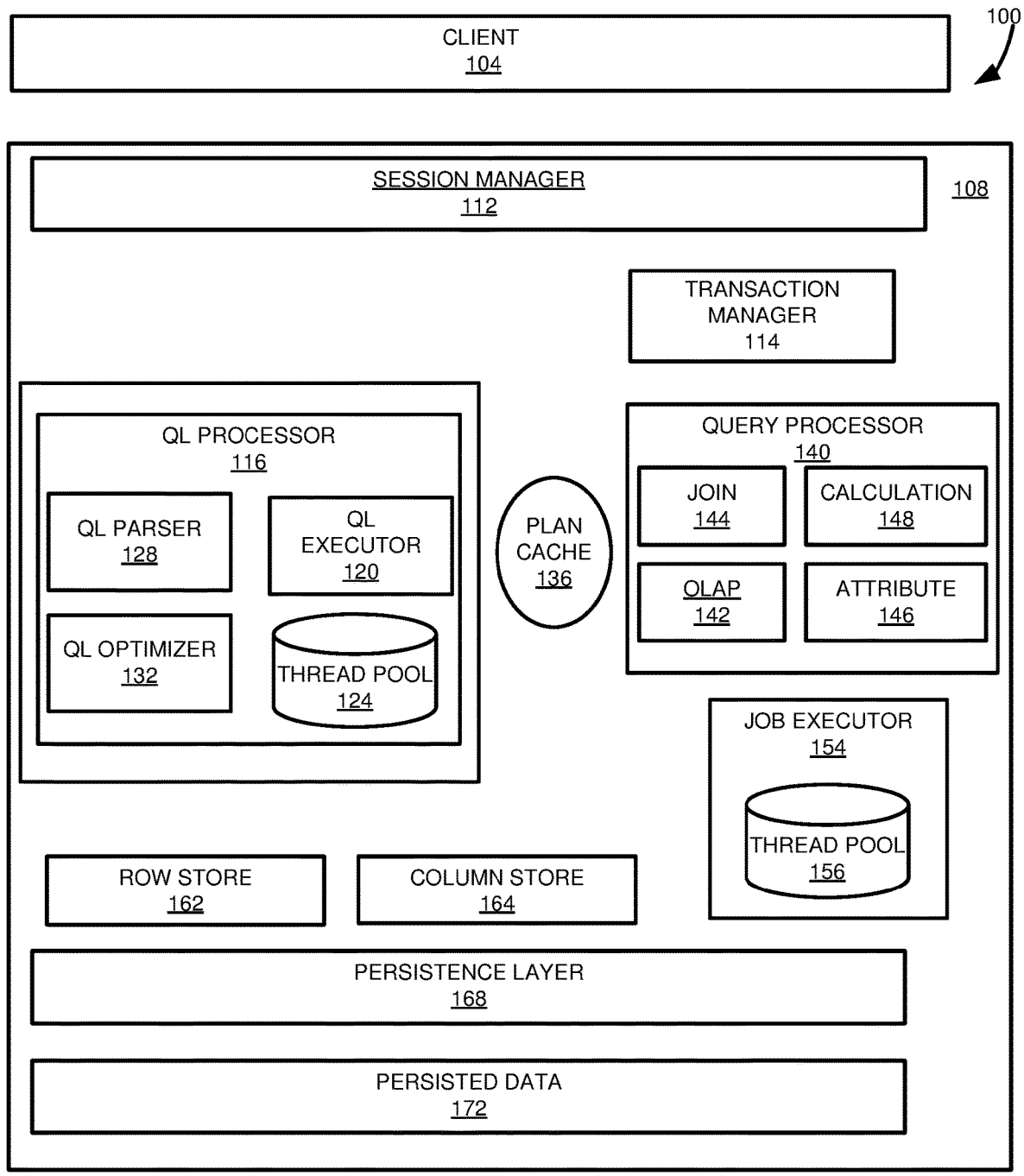
FIG. 1 is a diagram depicting a database environment having one or more clients and a database server in which at least certain implementations of a disclosed database request processing method may be used.

FIG. 1 illustrates an example database environment 100. The database environment 100 can include a client 104. Although a single client 104 is shown, the client 104 can represent multiple clients. The client or clients 104 may be OLAP clients, OLTP clients, or a combination thereof.

The client 104 is in communication with a database server 108. Through various subcomponents, the database server 108 can process requests for database operations, such as requests to store, read, or manipulate data. A session manager component 112 can be responsible for managing connections between the client 104 and the database server 108. Typically, the session manager 112 can simultaneously manage connections with multiple clients 104.

The session manager 112 can carry out functions such as creating a new session for a client request, assigning a client request to an existing session, and authenticating access to the database server 108. For each session, the session manager 112 can maintain a context that stores a set of parameters related to the session, such as settings related to committing database transactions or the transaction isolation level (such as statement level isolation or transaction level isolation). Once a connection is established between the client 104 and the database server 108, the clients usually communicates with the database server using a query language, such as the structured query language (SQL).

At least certain types of requests for database operations, such as statements in a query language to write data or manipulate data, can be associated with a transaction context. In at least some implementations, each new session can be assigned to a transaction. Transactions can be managed by a transaction manager component 114. The transaction manager component 114 can be responsible for operations such as coordinating transactions, managing transaction isolation, tracking running and closed transactions, and managing the commit or rollback of transactions. In carrying out these operations, the transaction manager 114 can communicate with other components of the database server 108.

The session manager 112 can communicate with a query language processor 116, such as a structured query language processor. For example, the session manager 112 may forward to the query language processor 116 query language statements or other database operation requests from the client 104. The query language processor 116 can include a query language executor 120, such as a SQL executor, which can include a thread pool 124. Some requests for database operations, or components thereof, can be executed directly by the query language processor 116. Other requests, or components thereof, can be forwarded by the query language processor 116 to another component of the database server 108. For example, transaction control statements (such as commit or rollback operations) can be forwarded by the query language processor 116 to the transaction manager 114. In at least some cases, the query language processor 116 is responsible for carrying out operations that manipulate data (e.g., SELECT, UPDATE, DELETE). Other types of operations, such as queries, can be sent by the query language processor 116 to other components of the database server 108.

When a connection is established between the client 104 and the database server 108 by the session manager 112, the session manger 112 can assign a client request, such as a query, to a thread of the thread pool 124. In at least one implementation, a thread is a context for executing a processing activity. The thread can be managed by an operating system of the database server 108, or by, or in combination with, another component of the database server. Typically, at any point, the thread pool 124 contains a plurality of threads. In at least some cases, the number of threads in the thread pool 124 can be dynamically adjusted, such in response to a level of activity at the database server 108. Each thread of the thread pool 124, in particular aspects, can be assigned to a plurality of different sessions.

When a query is received, the session manager 112 can determine whether an execution plan for the query already exists, such as in a plan cache 136. If a query execution plan exists, the cached execution plan can be retrieved and forwarded to the query language executor 120, such as to an execution thread of the thread pool 124 determined by the session manager 112. In a particular example, the query plan is implemented as an abstract data type.

If the query is not associated with an existing execution plan, the query can be parsed using a query language parser 128. The query language parser 128 can, for example, check query language statements of the query to make sure they have correct syntax, and confirm that the statements are otherwise valid. For example, the query language parser 128 can check to see if tables and records recited in the query language statements are defined in the database server 108.

The query can also be optimized using a query language optimizer 132. The query language optimizer 132 can manipulate elements of the query language statement to allow the query to be processed more efficiently. For example, the query language optimizer 132 may perform operations such as unnesting queries or determining an optimized execution order for various operations in the query, such as operations within a statement. After optimization, an execution plan can be generated for the query. In at least some cases, the execution plan can be cached, such as in the plan cache 136, which can be retrieved (such as by the session manager 112) if the query is received again.

Once a query execution plan has been generated or received, the query language executor 120 can oversee the execution of an execution plan for the query. For example, the query language executor 120 can invoke appropriate subcomponents of the database server 108.

In executing the query, the query language executor 120 can call a query processor 140, which can include one or more query processing engines. The query processing engines can include, for example, an OLAP engine 142, a join engine 144, an attribute engine 146, or a calculation engine 148. The OLAP engine 142 can, for example, apply rules to create an optimized execution plan for an OLAP query. The join engine 144 can be used to implement relational operators, typically for non-OLAP queries, such as join and aggregation operations. In a particular implementation, the attribute engine 146 can implement column data structures and access operations. For example, the attribute engine 146 can implement merge functions and query processing functions, such as scanning columns.

In certain situations, such as if the query involves complex or internally-parallelized operations or sub-operations, the query executor 120 can send operations or sub-operations of the query to a job executor component 154, which can include a thread pool 156. An execution plan for the query can include a plurality of plan operators. Each job execution thread of the job execution thread pool 156, in a particular implementation, can be assigned to an individual plan operator. The job executor component 154 can be used to execute at least a portion of the operators of the query in parallel. In some cases, plan operators can be further divided and parallelized, such as having operations concurrently access different parts of the same table. Using the job executor component 154 can increase the load on one or more processing units of the database server 108, but can improve execution time of the query.

The query processing engines of the query processor 140 can access data stored in the database server 108. Data can be stored in a row-wise format in a row store 162, or in a column-wise format in a column store 164. In at least some cases, data can be transformed between a row-wise format and a column-wise format. A particular operation carried out by the query processor 140 may access or manipulate data in the row store 162, the column store 164, or, at least for certain types of operations (such a join, merge, and subquery), both the row store 162 and the column store 164.

A persistence layer 168 can be in communication with the row store 162 and the column store 164. The persistence layer 168 can be responsible for actions such as committing write transactions, storing redo log entries, rolling back transactions, and periodically writing data to storage to provide persisted data 172.

Figure 2:
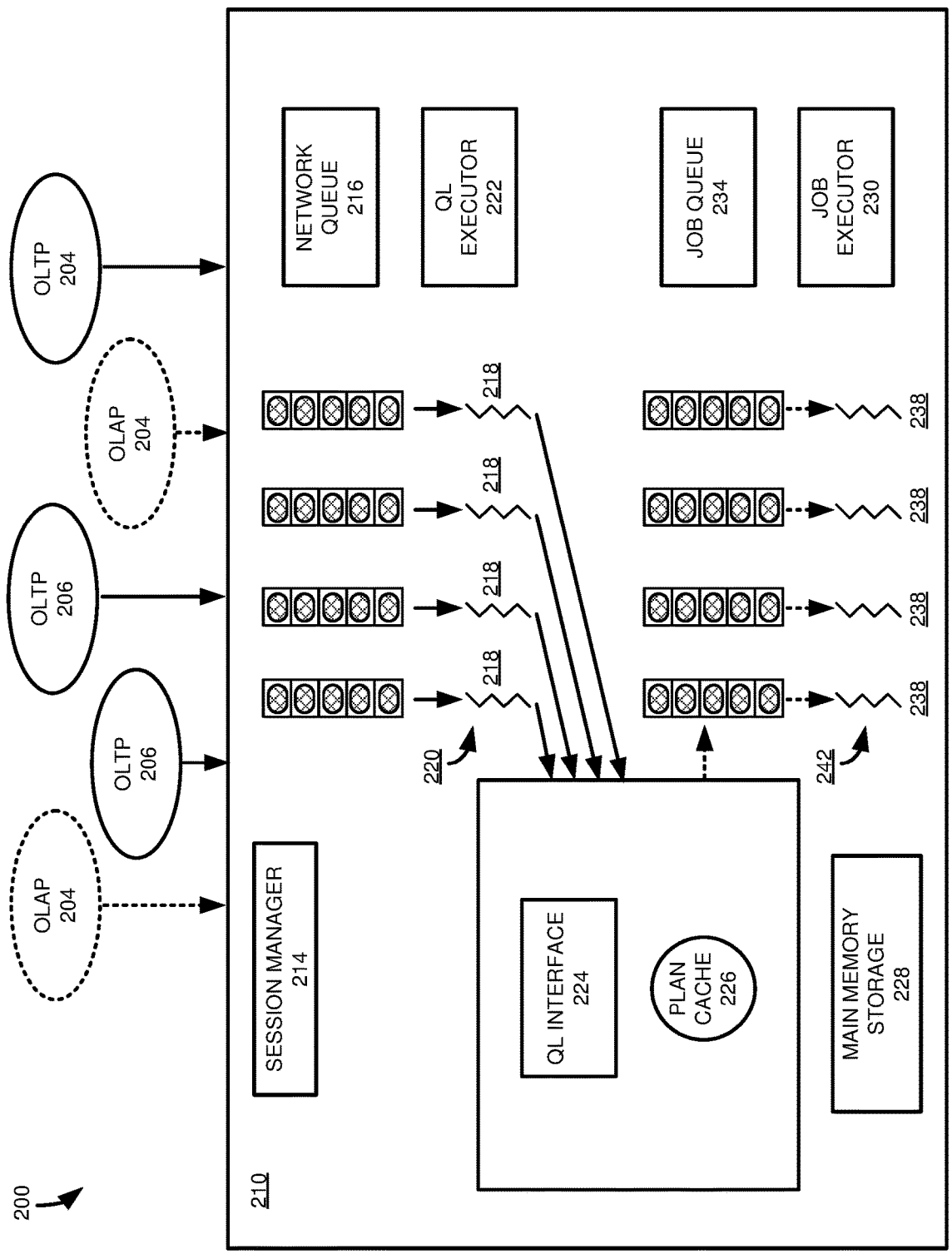
FIG. 2 is a diagram depicting a database environment providing for processing of requests for database operations by a query language executor and a job executor.

FIG. 2 is a diagram of a database environment 200 illustrating how query statements or operations may be delegated to a job execution thread. The database environment 200 incudes a plurality of clients 204 sending OLAP requests for processing and a plurality of clients 206 sending OLTP requests for processing. A session manager 214 of a database server 210 listens for requests from the clients 204 and 206. When an appropriate request is received, such as a query, the session manager 214 places the request in a network queue 216 to be sent to one of a plurality of query language execution threads 218 of a thread pool 220 of a query language executor 222. If the request includes data manipulation operations, the data manipulation operations can be carried out directly by the query language interface 224, such as using the query language processor 116.

When a request is received by a query language execution thread 218, its processing is immediately started by the query language execution thread. For example, the query language execution thread 218 may access a query language interface 224, which can, for example, include the query language processor 116 of FIG. 1. If, such as when determined by the session manager 214, a query is associated with a previously generated execution plan, the session manager 214 can retrieve the execution plan. For example, the session manager 214 can retrieve a stored execution plan from the plan cache 226. If an execution plan was not previously stored, an execution plan can be generated by the query language interface 224. In executing the query language statement, the query language interface 224 can access main memory storage 228, such as memory including the row store 162, the column store 164, or both, of FIG. 1.

As discussed above, for certain queries, such as OLTP queries, the query and its operations or sub-operations can be carried out by the query processor 140 of FIG. 1 using the query language interface 224. When the query has been processed, the results are returned to the corresponding query language execution thread 218, and in turn returned to the client 204, 206 from which the query language request was sent. This process can be useful for short running queries, as it can avoid thread context switching, which can consume processing and memory resources in stopping, switching, and restarting threads.

For other types of transactions, such as OLAP queries, the query language executor 222 can delegate the query, or components thereof, to a job executor 230, which can operate in parallel to the query language executor 222. The operations of the query can be placed in a job queue 234 and then sent to one or more job execution threads 238 of a job execution thread pool 242. The execution results of the job execution threads 238 are returned to the originating query language execution thread 218, and in turn to the client 204, 206 from which the request originated.

Figure 3:
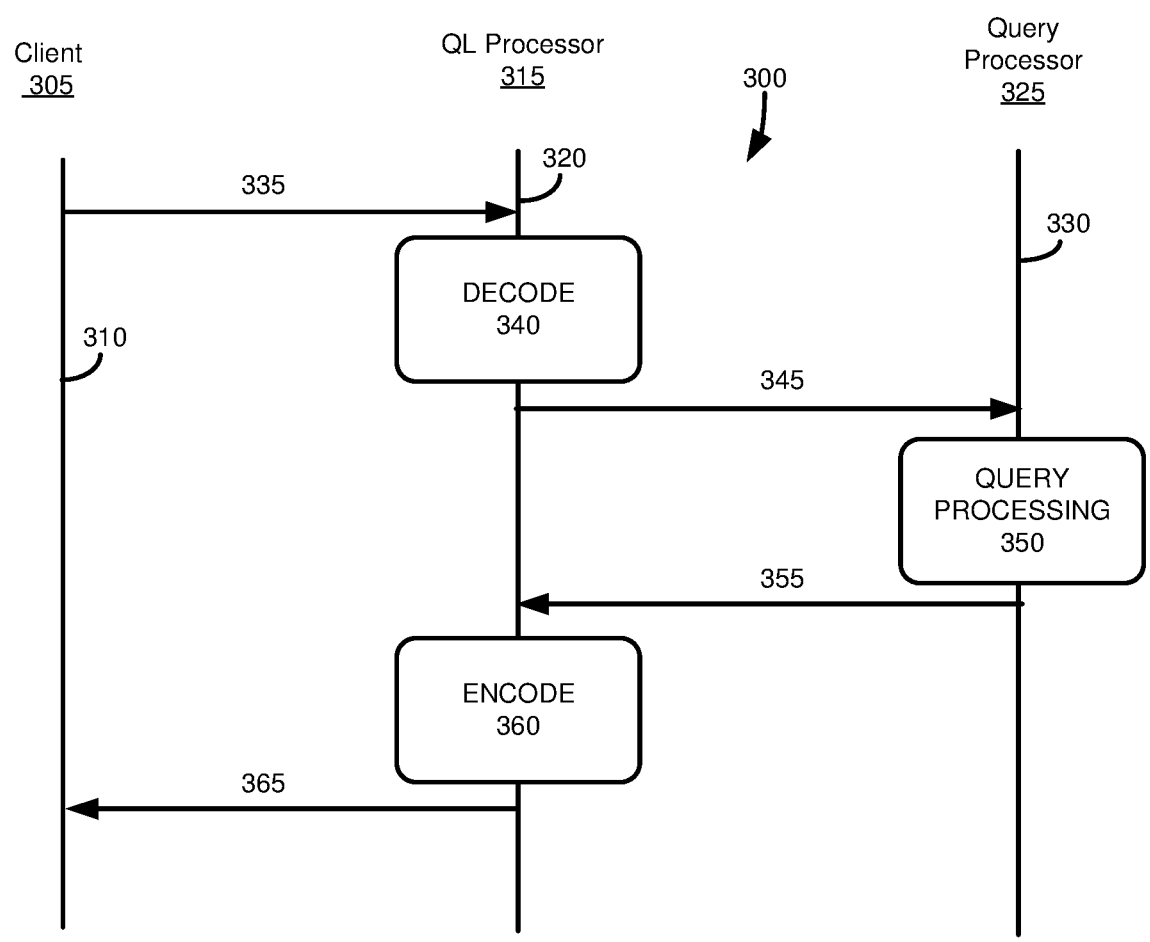
FIG. 3 is a diagram illustrating operations occurring at a query language processor and a query processor during execution of a query language request.

This process is further depicted in FIG. 3, a diagram of a database environment 300 illustrating operations occurring at a client 305, a query language processor 315, and a query processor 325, having respective execution times, 310, 320, 330. These components may be at least generally similar to the client 104, query language processor 116, and query processor 140 of FIG. 1.

In communication 335, the client 305 sends a request for a database operation. The request may first be processed by a session manger component (not shown) and then sent to the query language processor 315. When the request is received by the query language processor 315, the query language processor may decode the request in process 340. For example, the query language processor 315 may determine whether the request includes data manipulation statements, a query, or other types of operations, such as transaction control operations. If the request includes a query, the query language processor 315 may check to see if an execution plan has been previously generated for the query. If not, an execution plan can be generated.

Once the execution plan has been retrieved or generated, it is carried out by an execution thread of a query language executor of the query language processor 315 (such as the query language executor 120 of FIG. 1). The query language execution thread can send the query to the query processor 325 in communication 345, such as through a query language interface. The query language processor 325 carries out an execution plan for the query language request in process 350, such as involving appropriate query engines, such as the OLAP engine 142, the join engine 144, the attribute engine 146, or the calculation engine 148 of FIG. 1.

After execution of the query, the results are returned to the query language processor 315 (such as to the query language executor) by the query processor 325 in communication 355. The query language processor 315 encodes the results in process 360 and transmits the encoded results back to the client 305 in communication 365.

Figure 4:
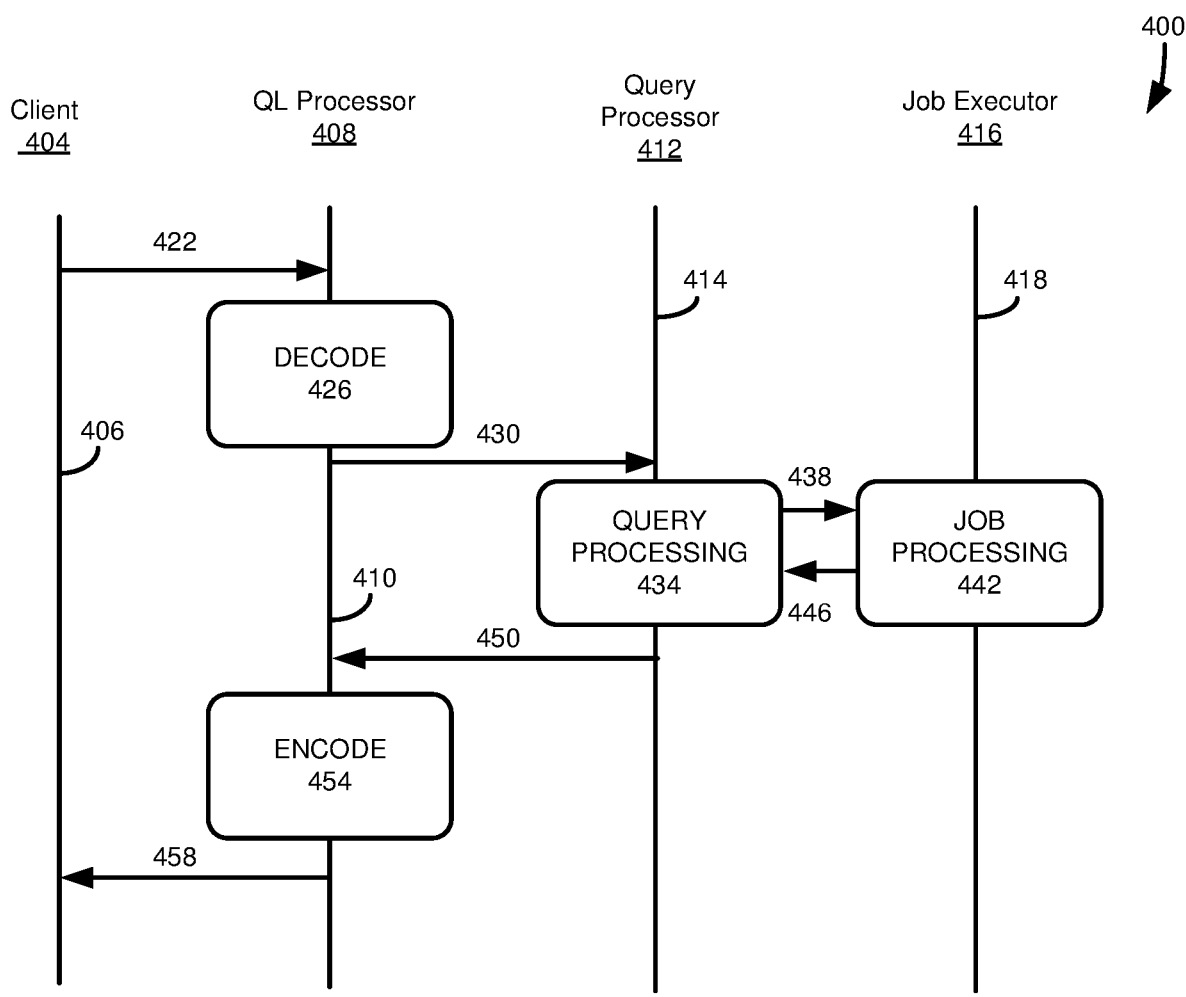
FIG. 4 is a diagram illustrating operations occurring at a query language processor, a query processor, and a job executor during execution of a query language request.

FIG. 4 is a diagram 400 illustrating operations occurring at a client 404, a query language processor 408, a query processor 412, and a job executor 416, having respective execution timelines 406, 410, 414, and 418. In communication 422, the client 404 sends a request for a database operation. The request may first be received by a session manager component (not shown) and then sent to the query language processor 408.

When the request is received by the query language processor 408, in process 426, the query language processor 408 decodes the request. If the request includes data manipulation statements, they may be executed by the query language processor 408. Other types of requests, such as transaction control statements, may be sent to another component for processing. If the query language processor 408 determines that the request includes a query, the query language processor can determine whether an execution plan has already been created for the query. If not, an execution plan can be generated.

Once the execution plan has been generated or retrieved, the query is forwarded to the query processor 412 in communication 430, such as using a query language interface. In executing the query, the query processor 412 can determine that the query includes operations that can be carried out in parallel. In at least certain cases, these operations can be sent, in communication 438, to the job executor 416 to be processed.

The job executor 416 carries out the query operations in process 442, such as using one or more, such as a plurality, of job execution threads. In some cases, the job execution threads can invoke the query processor 412, such as to use one or more query engines. In other cases, the job execution threads can directly access the appropriate query engines.

When the operations of the query have been completed by the job executor 416, they can be returned to the query processor 412 in a communication 446. In turn, the query processor 412 can return the results to the query language processor 408 in communication 450. The query language processor 408 can encode the execution results in process 454, and return them to the client 404 in communication 458.

As shown in FIG. 4, the query language processor, such as a query language execution thread, is idle during the query processing 434 and the job processing 442. Thus, the query language execution thread is idle, and unable to service new query language requests, even though processor use by the database system may be comparatively low.

Figure 5:
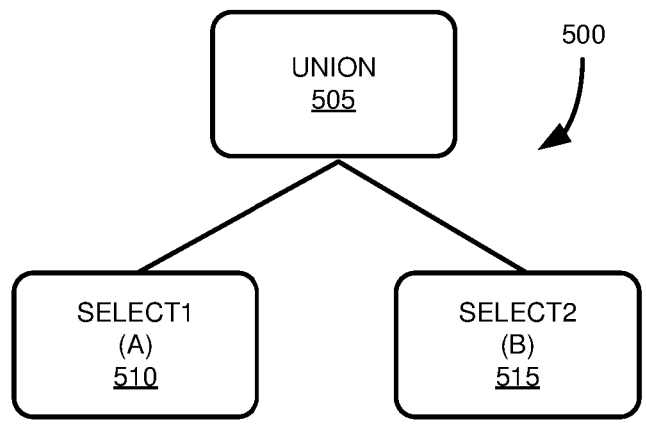
FIG. 5 is a diagram illustrating parallel execution of operations in a UNION operation.

FIG. 5 illustrates an example 500 of how this waiting situation might arise. Consider a UNION operation 505 that includes sub-operations of a first selection of records 510 from Table A and a second selection of records 515 from Table B. The UNION operation 505 cannot be completed until both SELECT sub-operations 510, 515 have completed. However, the delay in executing the UNION operation 505 results in, with reference to FIG. 2, the source query execution thread 218 being unable to accept new query language requests at the network queue 216.

Example 2—Context-Aware Workload Dispatching

Figure 6:
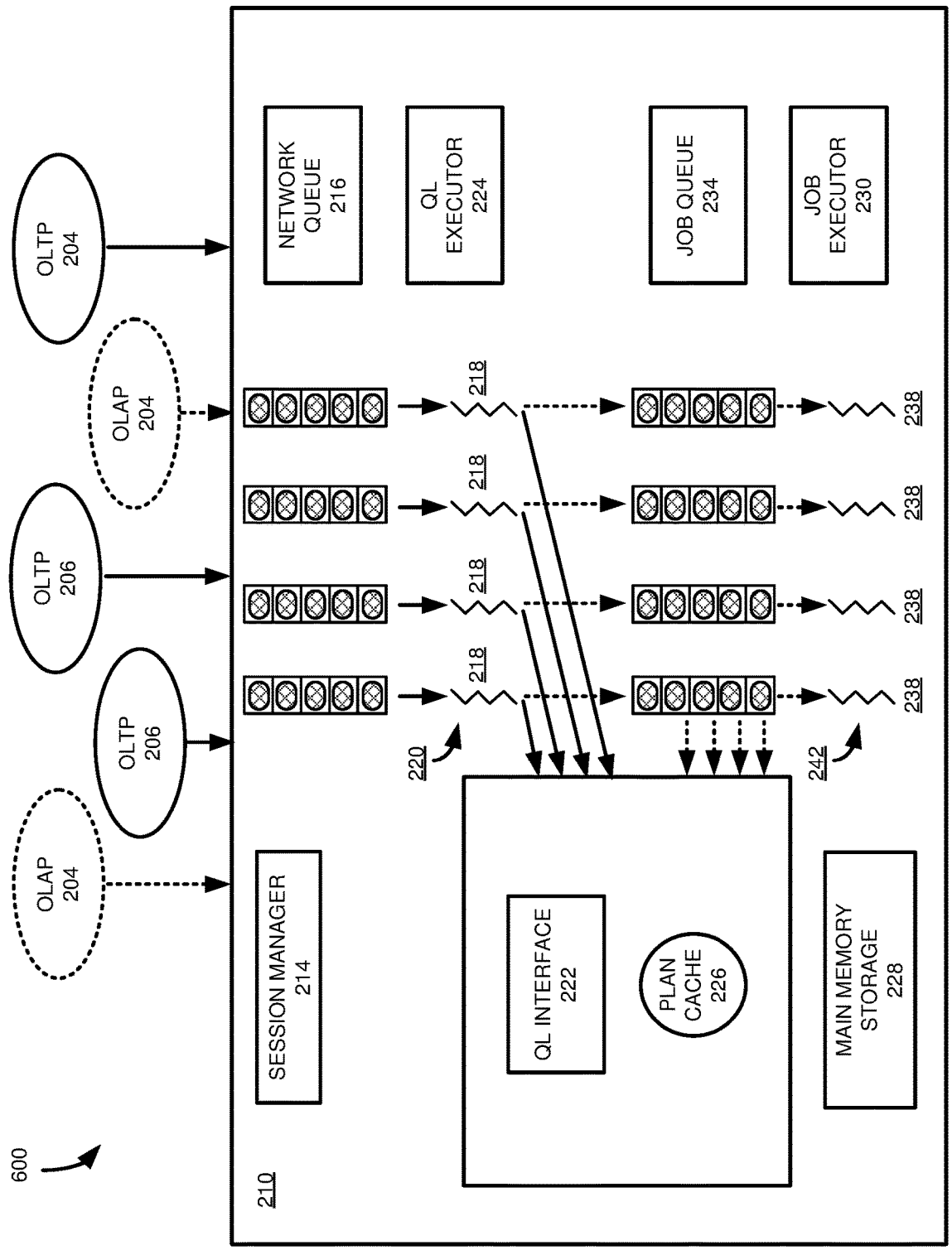
FIG. 6 is a diagram depicting a database environment providing for processing of requests for database operations by a query language executor and a job executor, with query language request delegation being determined by a session manager component.

With reference to FIG. 6, this Example 2 describes an example database environment 600 that can provide for improved query processing by determining, prior to execution, whether a query should be processed by a first execution component or a second execution component. FIG. 6 includes components that are at least generally similar to the components described with respect to FIG. 2. In addition, FIG. 6 can use the database environment depicted in FIG. 1.

In particular, the database environment 600 illustrates how, under certain circumstances, queries may be delegated to a job execution thread 238 of the job executor 230 prior to execution of the query. For example, if the query contains features, such as operations, that might delay execution or otherwise result in a long-running query, the query can be delegated to the job executor 230 prior the start of query execution.

As described above in conjunction with FIG. 2, the session manager 214 receives query language requests from clients 204 having OLAP database operation requests and clients 206 having OLTP database operation requests. It should be appreciated, however, that this Example 2, and the database environment 600, may be used with other types of requests for database operations (requests other than, or in addition to, OLAP or OLTP requests). In addition, in at least some cases, this Example 2 can be carried out by components other than those specifically described herein.

If a request contains a query (such as determined by a component of the query language interface 222, such as the query language processor 116 of FIG. 1), the session manager 214 assigns the query to a free query language execution thread 218 of the thread pool 220. A component of the database environment 600, such as the session manager 214, analyzes statistics associated with an execution plan associated with the query, such as an execution plan stored in the plan cache 226, or an execution plan generated by a component of the query language interface 222 (such as the query language optimizer 132 of FIG. 1). In other implementations, the analyzing can be carried out by, or in conjunction with, one or more additional components of the database environment 600.

If the execution plan indicates that the query does not contain operations likely to delay execution or otherwise result in a long-running query, such as having OLTP operations, or otherwise having no, or comparatively few, parallel operations, the session manger 214 (or other component) can determine that the query can be processed in a similar manner as described in conjunction with FIG. 2. That is, the query language execution thread 218 can pass the request to the query processor 140 of FIG. 1 using the query language interface 222, and as indicated using solid arrows.

If, on the other hand, the session manager 214 determines that the query includes operations that might delay execution or result in a long-running query, such as OLAP operations, or otherwise having, such as having a comparatively large number of, parallel operations, the session manager 214 can determine that the query should be delegated by the query language execution thread 218 to a job execution thread 238 of the job executor 230, as shown in dashed arrows. After the query has been delegated, the query language execution thread 218 can be returned to the thread pool 220, where it is available to service new or pending query language requests. After the query is executed by the job execution thread 238, the job execution thread can encode the results and send them to the appropriate client 204, 206.

As mentioned above, in some cases, the query may not have an execution plan stored in the plan cache 226. In some cases, such a query can be processed according to the process depicted in FIGS. 2-5. In a particular example, statistics from the execution of the query can be measured and used during future query processing. For example, the statistics can be stored in an execution plan stored in the cache 226 for the next time the query is received. In other cases, the database environment 600 may use another method to determine whether the query language execution thread 218 should delegate the query to a job execution thread 238. For example, statistics may be generated during optimization of the query by the query language optimizer 132 of FIG. 1. These statistics may be used in a similar manner as the statistics associated with a cached execution plan to determine whether the query should be executed by a query language execution thread 218 or a job execution thread 238. In another example, the query can be assigned a type (such as a type based on the query including a certain number, or type or types, of operations, or other measures of complexity) and execution statistics associated with the type (or a rule based on execution statistics associated with the type) used to determine whether the query should be executed by a query language execution thread 218 or a job execution thread 238.

Figure 7:
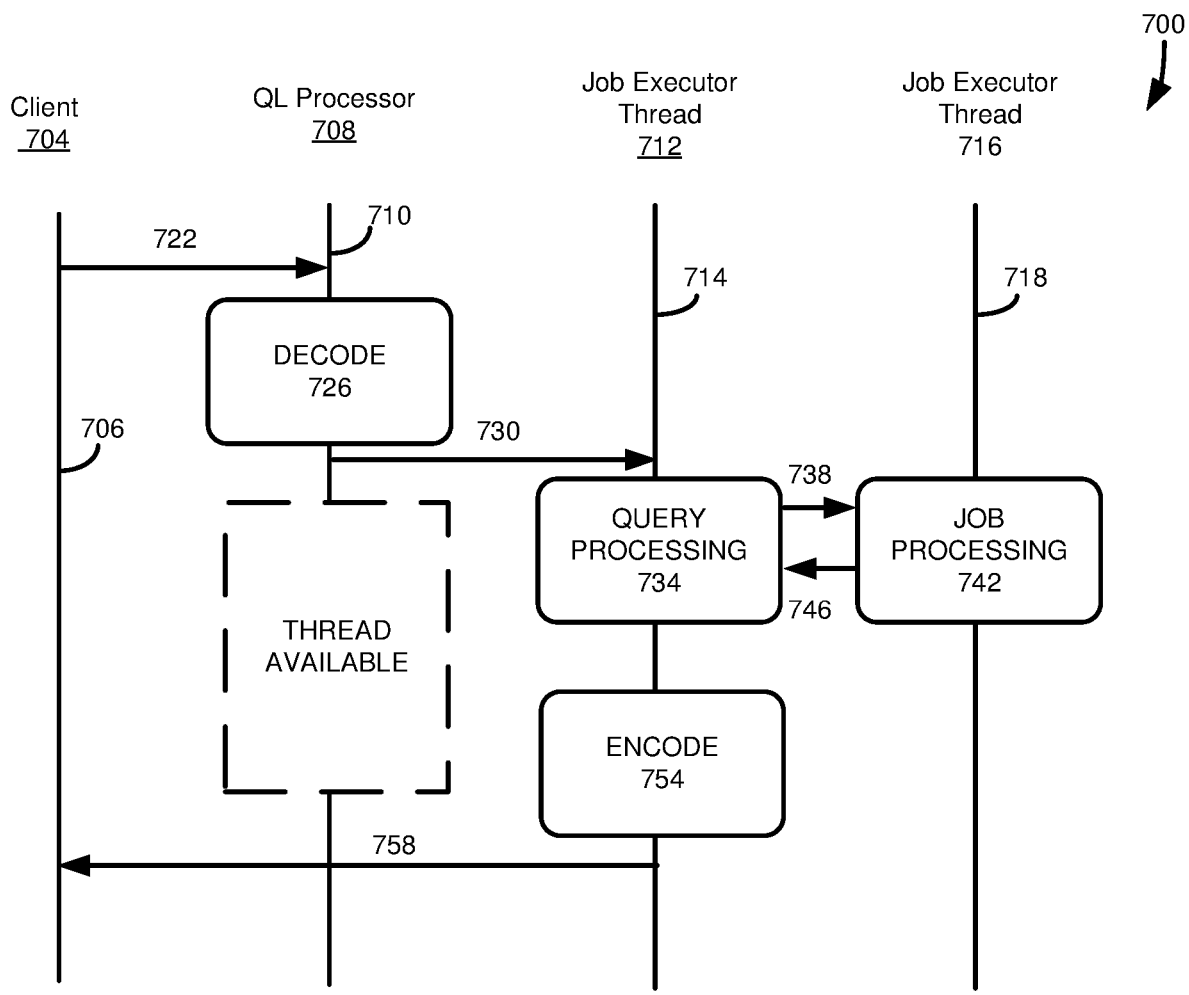
FIG. 7 is a diagram illustrating operations occurring at a query language processor, a first, delegee, job execution thread, and a second job execution thread during execution of a query language request.

The process of determining whether a query execution thread 218 should delegate a query is further depicted in diagram 700 of FIG. 7, which illustrates operations occurring at a client 704, a query language processor 708, a first, delegee, job execution thread 712, and a second job execution thread 716, having respective execution times, 706, 710, 714, 718. In communication 722, the client 704 sends a query language request. The communication 722 may be received by a session management component (not shown) and then sent to the query language processor 708. In process 726, the query language processor 708 decodes the query language request. If the query language request includes data manipulation statements, it may be directly executed by the query language processor 708. Other types of requests may be sent to another component of a database environment. For example, transaction control statements may be forwarded to a transaction manager component.

If the request includes a query, the session manager (or other component) analyzes statistics associated with the query. For example, the session manager can retrieve and analyze statistics associated with a cached execution plan, or statistics generated by a query language optimizer.

If, in association with process 726, the session manager determines that query does not contain operations likely to delay execution or otherwise result in a long-running query, the session manager can determine that the query should be executed by the query language processor 708 (such as using a query language execution thread of a query language executor) in a process analogous to that described with respect to FIG. 3, and which will not be further described with reference to FIG. 7. If the session manager determines that the query contains operations likely to delay its execution or otherwise result in a long-running query, or has statistics that would indicate potentially delayed execution, or statistics that indicate that parallelization would enhance execution of the query, the session manager can cause the query language execution thread 708 to delegate the query to the delegee job execution thread 712 in communication 730.

The delegee job execution thread 712 processes the query in process 734. As part of the query processing, the delegee job execution thread 712 can pass query operations to one or more additional job execution threads 716 in communication 738 (which can represent multiple communications). The one or more job execution threads 716 carry out job processing in process 742. At least some of the processing may be carried out in parallel, such as using multiple job execution threads. When job processing is completed, the one or more job execution threads 716 send execution results to the delegee job execution thread 712 in communication 746.

After receiving the results from the one or more additional job execution threads 716, the delegee job execution thread 712 encodes the results in process 754. The encoded results are returned to the client 704 in communication 758.

In the process shown in FIG. 7, once the query has been delegated by a query language execution thread of the query language processor 708 to the delegee job execution thread 712, the query language execution thread can return to an idle state, where it can accept other new or pending query language requests. Thus, by freeing up query language execution threads, the process described in this Example 2 can improve the throughput and processing times for query requests, particularly for OLTP requests. This improvement can be particularly beneficial in database management systems having mixed OLTP and OLAP workloads.

Statistics measured, collected, and analyzed to determine whether a query language request should be delegated from a query language execution thread to a job execution thread can include statistics related to the nature or type of the request. Examples of query language requests include requests to compile a query, requests to execute a query, requests to close a cursor, requests to read or write large binary objects, batch execution requests, and authentication requests. Certain types of requests, such as non-query requests, can selected, such as by a session manager component, for execution by a query language execution thread or another execution component.

Execution statistics can also include the time taken to execute a particular request, such as an average or other computer value for a particular type of query, or as indicated for the query in an execution plan associated with the query. The average execution time for statements or operations in the query can also be collected and analyzed. In some cases, the average execution time of a query, or statements or operations of the query, can be collected by a component of the database management system, such as the query processor 140 of FIG. 1, and stored in the plan cache 136.

The average number of threads involved with the query, such as the number of threads used to execute a single statement, can also be measured and analyzed. For example, a UNION operator can be parallelized, creating two jobs to be executed by job execution threads. So, for a UNION statement, the number of involved threads is two. In some cases, the number of threads required for all operations in the query can be determined and analyzed to determine whether the query should be delegated. If network calls are involved in the query language request, they can also be measured and analyzed, as they can affect execution time.

In some cases, one or more components can be added to the database management system to collect or analyze the statistics. In other cases, existing database management system components can be used, such as shown in FIG. 8.

Figure 8:
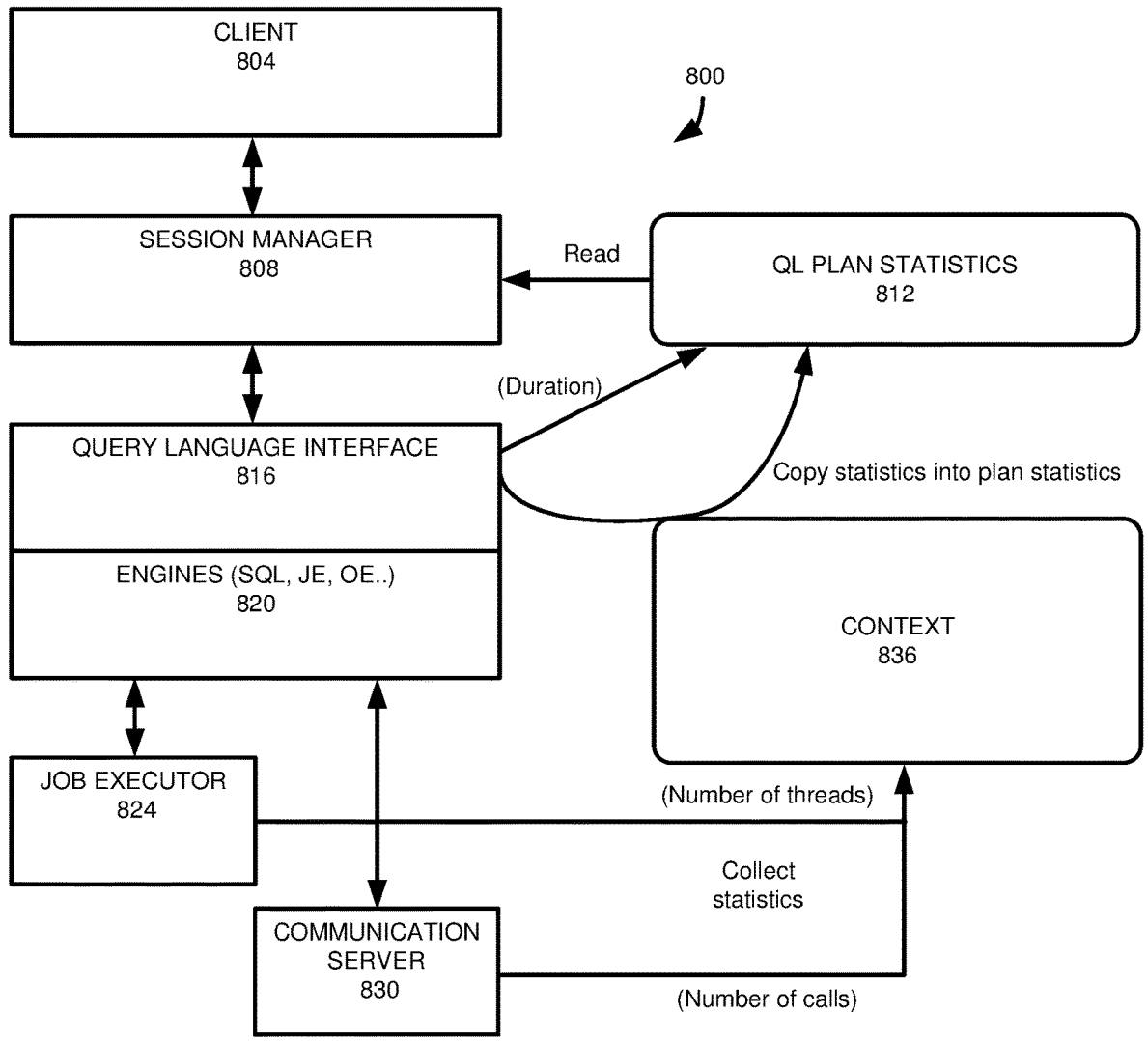
FIG. 8 is a diagram depicting a database environment providing for accessing or measuring execution statistics.

FIG. 8 illustrates a database environment 800 that can be used to carry out the process of this Example 2, including the collection and analysis of statistics associated with a query. The database environment 800 includes a client 804, which can issue query language requests and receive execution results. The requests, and sending of responses, can be mediated by a session manager 808. In addition, when the query language request includes a query, the session manager 808 can read and analyze query plan statistics 812 associated with the query. In a particular example, the query plan statistics 812 can be implemented as an abstract data type. As explained above, in some cases, the query plan statistics can be stored in a plan store, such as the plan cache 136 of FIG. 1. In other cases, the query plan statistics 812 can be obtained from another component of the database management system 800, such as the query language optimizer 132 of FIG. 1.

After analyzing the query plan statistics 812, the session manager 808 forwards the query to a query language interface 816, which can include the query language processor 116 of FIG. 1. The query language interface 816 can pass the query to various engines 820, which can in turn involve the query processor 140 of FIG. 1 and its associated engines, including the OLAP engine 142, the join engine 144, the attribute engine 146, or the calculation engine 148. The query language interface 816 can communicate with the query plan statistics 812, such as to create or update plan statistics associated with the execution time of the query, including, in some cases, the execution time associated with individual operations or sub-operations included in the query.

Depending on the analysis of the query plan statistics 812, the query language request can be delegated by a query language execution thread to a job execution thread of a job executor 824. The job executor 824 may also invoke one or more engines of the engines 820 in order to carry out the operations of the query.

In some cases, in order to execute the query, the engines 820 may need to access resources over a network. For example, the database environment 800 may include multiple database servers. A particular query may require the engines to access data at more than one database server. The database environment 800 can include a communication server component 830 to mediate communications to provide such access.

Components of the database environment 800 can measure statistics of the query plan statistics 812. In some cases, the components can directly access and update the query plan statistics 812. The query language interface 816 can, in some examples, directly update the query plan statistics 812 regarding the duration of the query or operations or sub-operations within the query.

In other cases, components of the database environment 800 can measure statistics and update a context 836 associated with the query, such as a context 836 implemented as an abstract data type. The context 836 can be used to store other information related to the query request, such as a timestamp associated with the time the query language requested was initiated, a session identifier, a transaction identifier, a statement identifier, dependencies on other jobs, and the number of threads used to execute the query. The context 836 can be made available to components of the database environment 800 at multiple execution layers.

In some implementations, the communication server 830 can measure the number of network calls and update the context 836. Similarly, the job executor 824 can measure the number of threads involved in the query (or operations or sub-operations of the query) and update the context 836, which can then be used to update the query plan statistics 812. In a specific embodiment, the query language interface 816 reads information from the context 836 and copies appropriate information into the query plan statistics 812.

Analyzing statistics to determine whether a query should be delegated from a query execution thread to a job execution thread can include comparing one or more of the query plan statistics 812 to a threshold value. In some cases the values can be compared, and the delegation decision made, based on the relationship of a single value to its threshold. For example, the delegation decision may be made if a single value of the number of threads or the number of network calls exceeds its threshold value. In other cases, the delegation decision can be based on the relationship of a combination of values of the query plan statistics 812 to their respective threshold values. For example, the query may be delegated if the number of threads exceeds a first threshold value and the number of network calls exceeds a second threshold value. In some cases, the delegation decision may be made based on a weighted combination of the statistics compared with their respective threshold values.

Figure 9:
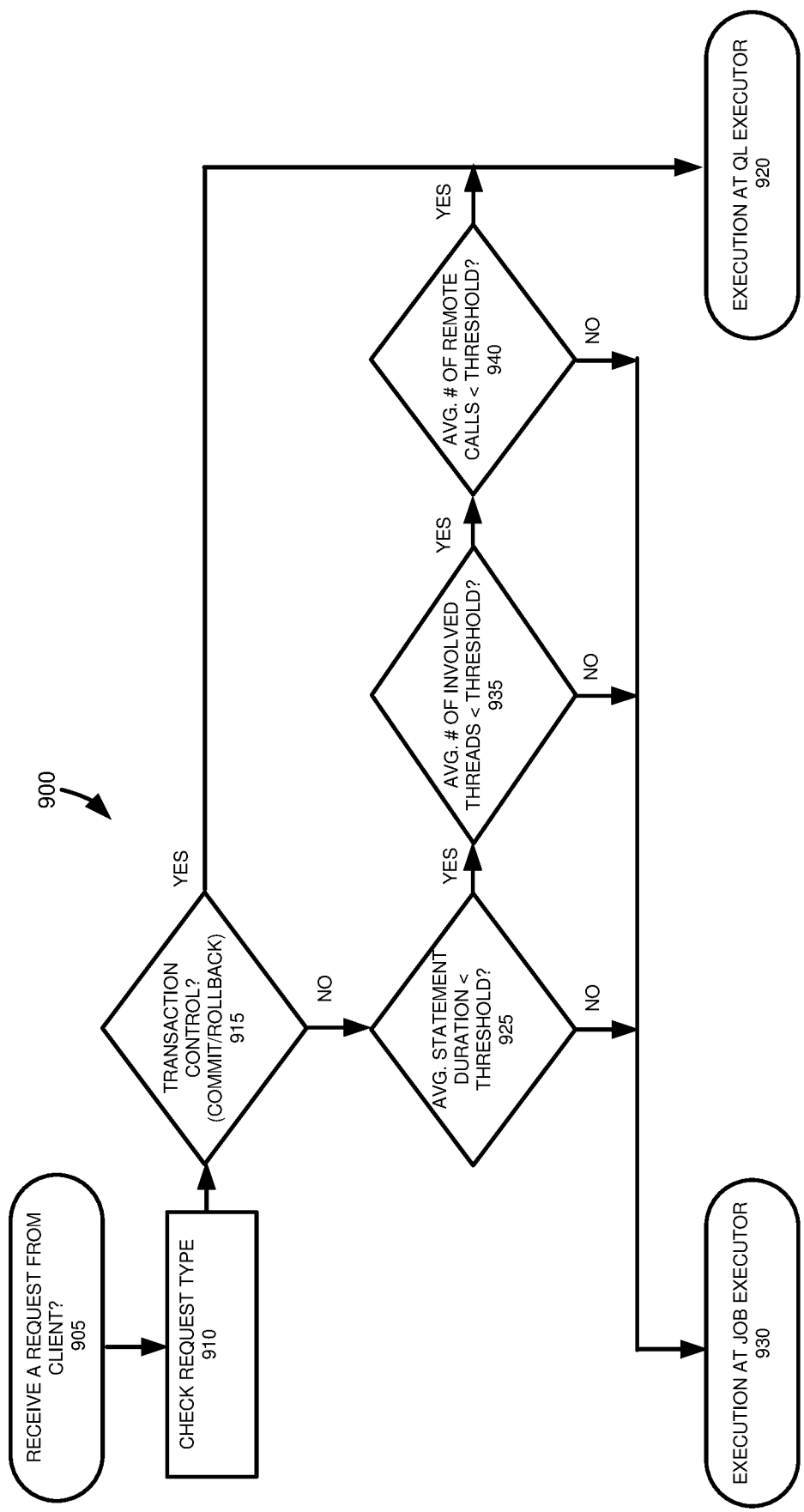
FIG. 9 is a flowchart of an example method for determining whether a query language request should be delegated to a second execution component.

FIG. 9 illustrates an example method 900 for determining whether a query language request received from a client should be delegated from a query language execution thread to a job execution thread. In a specific example, the method 900 is carried out by the session manager 112 of FIG. 1. In other examples, the method 900 is carried out by a different component, or a combination of components.

In step 905, the method 900 waits for a query language request to be received, such as from a client. In process 910, the method 900 checks the type of request. In decision 915, the process also determines whether the query language request is a request to carry out a transaction control statement. For example, the decision 915 may determine whether the query language request is a request to commit or rollback a transaction. If the query language request is a transaction control request, the query language request is executed with a query language execution thread in process 920.

If decision 915 determines that the query language request is not a transaction control request, the method 900 proceeds to decision 925. Decision 925 determines, such as based on query plan statistics associated with a query of the query language request or a cached query plan associated with the query, whether the average statement duration exceeds a threshold. In other aspects, in place of, or in addition to, average statement duration, decision 925 can determine whether the average execution time for the query, or for all or a portion of operations or sub-operations within the query, exceeds a threshold. If decision 925 determines that the threshold has been exceeded, the query is delegated to a job execution thread and executed in process 930.

If decision 925 determines that the threshold has not been exceeded, in decision 935, the process 900 determines whether the average number of threads involved in a query of the query language request exceeds a threshold. If the threshold has been exceeded, the query is delegated to the job execution thread and executed in the process 930. If the threshold has not been exceeded, the method 900 proceeds to decision 940, determining whether the average number of remote calls (such as network calls) for a query of the query language request exceeds a threshold. If the threshold is exceeded, the query is delegated to a job execution thread and executed in the process 930. If the threshold has not been exceeded, the query is executed with the query language execution thread in process 920.

Although FIG. 9 has been described with a particular set of threshold comparisons occurring in a particular order, it should be appreciated that the comparisons 925, 935, 940 can be carried out in a different order. As described above, the comparisons 925, 935, 940 may also be combined or weighted. In addition, the method 900 can include more, fewer, or a different number or type of comparisons, including comparisons not described in FIG. 9, and decision 915 may be omitted, or other decision steps included in the method.

Figure 10:
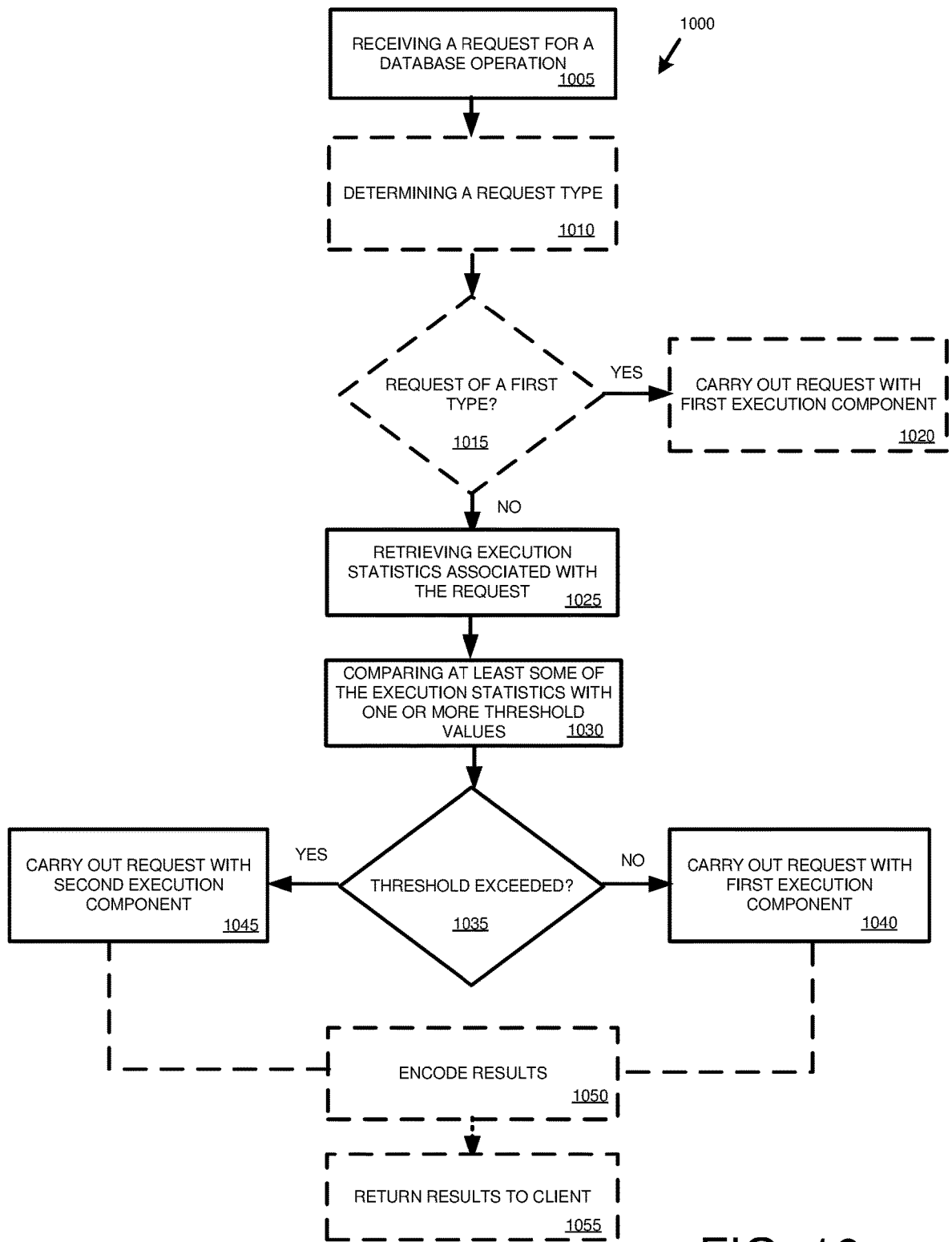
FIG. 10 is a flowchart of an example method for determining whether a query language request should be delegated to a second execution component.

FIG. 10 presents a flowchart of a method 1000 according to this Example 2. In step 1005, a component of a database management system receives a request for a database operation. In a particular example, the request is a query language request, such as a request that includes one or more transactions or a query. The query can include one or more statements, which can in turn be associated with one or more operations or sub-operations. In a particular example, the request is received by a component of the database management system responsible for mediating communications with clients. For example, a session manager component can listen for incoming client requests and assign each request to a database processing component.

In optional step 1010, a component of the database management system, such as the session manager component, can determine a type for the request. The type can be, for example, a request to compile a query, to execute a query, to fetch a result, to close a cursor, to carry out batch executions, to read or write a large binary object, to carry out authentication operations, or to carry out transaction control operations, such as a request to commit a transaction or a request to rollback a transaction.

In optional decision 1015, the method 1000 determines whether the request is of a first type. If the request is of the first type, the method 1000 can carry out the request using a first execution component in process 1020. In a particular implementation, the first type is a transaction control operation. If the request is not of the first type, or if the decision 1015 is omitted, the method 1000 can proceed to step 1025.

In step 1025, the method 1000 retrieves execution statistics associated with the request, such as execution statistics associated with a query plan. For example, the request may be a query associated with a stored query execution plan, such as a stored query execution plan, that includes at least a portion of the execution statistics. In another aspect, the execution statistics are stored in another manner. In a further aspect, the execution statistics can be obtained by generating an execution plan for the request, such as during optimization of query processing, or by retrieving execution statistics for a request type represented by the request.

One or more of the execution statistics are compared with one or more threshold values in step 1030. In some cases, execution statistics to be compared, or the threshold values, can be set by a user providing user input, such as a database administrator. Based on results of the comparing, the method 1000 determines whether the request should be executed by a first execution component or delegated to a second execution component.

In a particular example, the method 1000 checks in decision 1035 to see if one or more of the threshold values has been exceeded. If the one or more threshold values have not been exceeded, the request, such as a query, is carried out by a first execution component in process 1040, such as by a query language execution thread in communication with a query language processor. If the one or more threshold values have been exceeded, the request can be delegated to a second execution component, such as a job execution thread of a job executor component, and executed in process 1045. When the second component is a job execution thread, the job execution thread can carry out statements or operations of the request using one or more additional job execution threads.

In optional step 1050, after the request, such as a query, has been carried out, execution results can be encoded to a format useable by the client. For example, the execution results can be encoded by the component which carried out the request. In optional step 1055, the execution results can be returned to the client, such as by the component which carried out the request.

The method 1000 can include additional steps. For example, the method 1000 can include measuring execution statistics during execution of the request. In a particular example, a request, such as a query, may be received for which execution statistics have not previously been measured or stored. In one implementation, in this scenario, the request may be executed in a manner other than as shown in FIG. 10. According to a particular aspect, the request can be executed by the first execution component, which can in turn use the second execution component. For example, with reference to the database environment 100 of FIG. 1, if execution statistics have not previously been stored, such as in the plan cache 136, the request can be executed as described in FIGS. 2 and 3. Execution statistics can be measured when the request is executed, and then stored. If the request is received again, the method 1000 can be carried out using the previously measured execution statistics.

In another aspect, execution statistics can be measured during the execution of method 1000. The measured execution statistics can be used to update the execution statistics associated with the request, such as execution statistics stored in the plan cache 136 of FIG. 1. For example, during execution of the method 1000, components of the database system 100 of FIG. 1 can measure statistics and associate them with an execution context for the request. Components which can measure statistics include the query language executor 120 and the job executor 154 of FIG. 1, and the communication server 830 of FIG. 8.

In a further aspect, if execution statistics have not been previously measured during the execution of the request, execution statistics, such as prospective execution statistics (including execution statistics for a type of request represented by the request), can be obtained from another component of the database system. For example, the query language optimizer 132 may determine a number of operations, a number of network calls, a number of needed threads, or a number of parallel operations carried out in executing the request.

In some cases, the method 1000 can be selectively enabled. For example, one or more criteria may be set for when the method 1000 should be enabled or disabled. One criteria may be processor utilization of a computing system responsible for implementing the method 1000. As delegation to the second execution component (such as a job execution thread) can increase processor usage, the method 1000 can be set to be disabled when processor use exceeds a threshold, or enabled when processor use is below a threshold.

The number of available query language execution threads can also be used to determine whether the method 1000 should be enabled. If the number of available execution threads is too low, the database system may be unable to timely process new client requests. Accordingly, the method 1000 can be enabled if the number of available query language execution threads is less than a threshold amount. Similarly, the time needed to execute requests, particularly OLTP requests can be monitored. If OLTP requests are determined to be taking longer than a threshold amount, the method 1000 can be enabled. Delegation of requests, particularly OLAP requests, to job execution threads can free up query language execution threads to process incoming OLTP requests.

As described above, in at least some cases, query language execution threads may be unable to handle additional client requests until a prior request has been completed. In such cases, additional query language execution threads can be spawned to handle additional requests. However, this process can result in a large number of active threads, which can negatively affect system performance (such as processor use). Therefore, in some implementations, the method 1000 can be enabled if the number of active query language execution threads exceeds a threshold.

Example 3—Computing Systems

Figure 11:
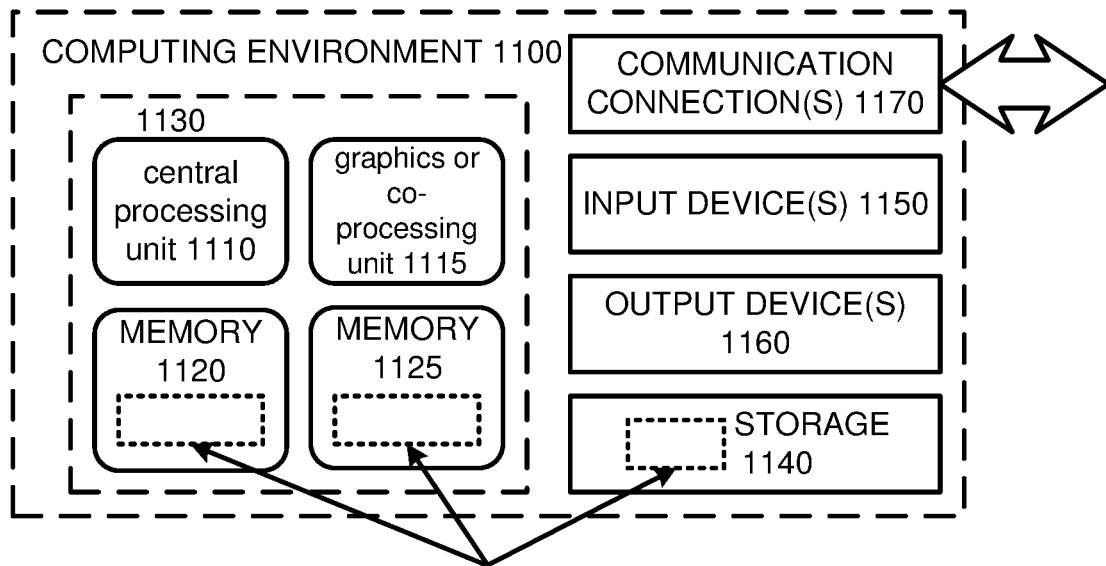
FIG. 11 is a diagram of an example computing system in which some described embodiments can be implemented.

FIG. 11 depicts a generalized example of a suitable computing system 1100 in which the described innovations may be implemented. The computing system 1100 is not intended to suggest any limitation as to scope of use or functionality of the present disclosure, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions, such as for implementing a database environment, and associated methods, described in Examples 1 and 2. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115. The memory 1120, 1125, may also store database data, such as data in the row store 162 or the column store 164 of FIG. 1.

A computing system 1100 may have additional features. For example, the computing system 1100 includes storage 1140 (such as for storing persisted data 172 of FIG. 1), one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100. In some cases, the operating system can manage, or assist in managing, query language execution threads or job execution threads.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1120 implementing one or more innovations described herein.

The input device(s) 1150 may be a touch input device such as a keyboard, mouse, pen, or trackball, a voice input device, a scanning device, or another device that provides input to the computing system 1100. The output device(s) 1160 may be a display, printer, speaker, CD-writer, or another device that provides output from the computing system 1100.

The communication connection(s) 1170 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 4—Cloud Computing Environment

Figure 12:
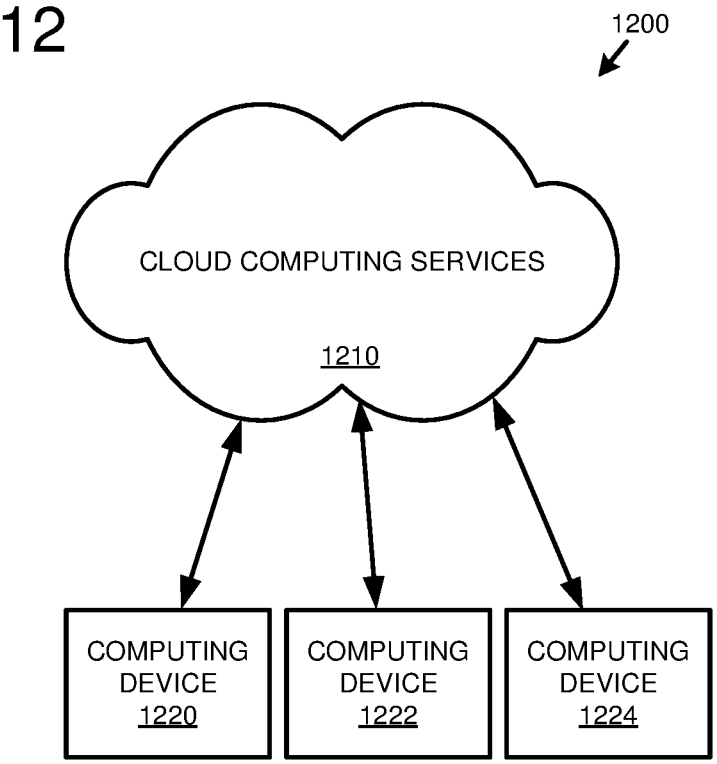
FIG. 12 is an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operators (e.g., data processing, data storage, and the like).

Example 5—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A server comprising:
a memory;
one or more processing units coupled to the memory; and
one or more computer readable storage media storing computer-executable instructions that, when executed, cause the computing system to perform operations comprising:
implementing a query language executor, the query language executor having a first thread pool;
implementing a job executor, the job executor having a second thread pool different than the first thread pool;
at a first time, receiving a first request for a first set of database operations from a first client, the first set of database operations accessing a first set of one or more database tables, the first set of one or more database tables being accessible to the query language executor and the job executor;
executing the first request to provide first query execution results;
during the executing the first request, measuring a first set of execution statistics for the first set of database operations;
at a second time, the second time being after the first time, receiving with a first thread of the query language executor a second request for the first set of database operations from a second client, where the second client is the first client or is a client other than the first client;
determining a first request type for the first set of database operations;
determining that the first request type is an online analytical processing (OLAP) request;
responsive to determining that the first request type is an online analytical processing (OLAP) request:
retrieving first execution statistics defined for the first set of database operations measured during one or more prior executions of the first set of database operations, the first execution statistics based at least in part on the first set of execution statistics;
comparing at least some of the first execution statistics with one or more threshold values defined to determine whether the second request should be executed by either the query language executor or the job executor;
determining that the first execution statistics satisfy conditions for executing the second request at the query language executor using the first thread;
initiating execution of the second request with the query language executor to provide second query execution results;
sending the second query execution results to the second client by the first thread;
at a third time, the third time being after, before, or concurrent with the second time, receiving a third request for a second set of database operations from a third client, where the third client is the first client, the second client, or a client other than the first client or the second client, the second set of database operations accessing a second set of one or more database tables, the second set of one or more database tables being accessible to the query language executor and the job executor, wherein the second set of one or more database tables is the first set of one or more database tables or is a set of one or more database tables different than the first set of one or more database tables;
executing the third request to provide third query execution results;
during the executing the third request, measuring a second set of execution statistics for the second set of database operations;
at a fourth time, the fourth time being after the third time, receiving with a second thread of the query language executor, a fourth request for the second set of database operations from a fourth client, where the fourth client is the first client, the second client, the third client, or is a client other than the first client, the second client, or the third client and the second thread is the first thread or a thread other than the first thread;
determining a second request type for the second set of database operations;
determining that the second request type is an online analytical processing (OLAP) request;
responsive to determining that the second request type is an online analytical processing (OLAP) request:
retrieving second execution statistics defined for the second set of database operations measured during one or more prior executions of the second set of database operations, the second execution statistics based at least in part on the second set of execution statistics, wherein the second execution statistics are different than the first execution statistics;
comparing at least some of the second execution statistics with the one or more threshold values defined to determine whether the fourth request should be executed by either the query language executor or the job executor;
determining that the second execution statistics do not satisfy conditions for executing the fourth request at the query language executor;
with the query language executor, delegating the fourth request to the job executor for execution;
in response to delegating the fourth request to the job executor, releasing the second thread, wherein upon release the second thread is available to receive requests from one or more clients;
executing the fourth request with one or more threads of the second thread pool at the job executor to provide fourth query execution results; and
sending the fourth query execution results to the fourth client using a thread of the second thread pool.

2. The server of claim 1, the operations further comprising:
measuring a third set of execution statistics during execution of the second request.

3. The server of claim 2, wherein the measuring the third set of execution statistics is carried out by components of the database system executing the second request.

4. The server of claim 2, the operations further comprising:
updating the first execution statistics based on the third set of execution statistics to provide updated first execution statistics; and
storing the updated first execution statistics in a plan cache.

5. The server of claim 2, the operations further comprising:
updating the first execution statistics based on the third set of execution statistics to provide updated first execution statistics.

6. The server of claim 1, the operations further comprising:
generating an execution plan for the second request, the execution plan comprising at least a portion of the first execution statistics.

7. The server of claim 1, the operations further comprising:
with the job executor, encoding the fourth query execution results; and
wherein sending the fourth query execution results to the fourth client comprises sending encoded fourth query execution results to the fourth client from the job executor.

8. The server of claim 1, the operations further comprising:
assigning an operation of the fourth request to an additional execution thread of the job executor.

9. The server of claim 1, the operations further comprising:
carrying out the second request with the query language executor while the fourth request is being carried out by the job executor.

10. The server of claim 1, the operations further comprising:
receiving a fifth request comprising a third set of database operations; and
responsive to determining that the fifth request is an online transaction processing (OLTP) request, executing the fifth request with the query language executor.

11. The server of claim 1, wherein at least one of the one or more threshold values is user-configurable.

12. The server of claim 1, the operations further comprising:
determining that the one or more processing units have a processing load lower than a threshold value of the one or more threshold values.

13. The server of claim 1, wherein the first set of execution statistics comprise a duration of the first request, a number of threads associated with execution of the first request, a number of parallel operations associated with execution of the first request, or a number of remote calls associated with execution of the first request.

14. One or more tangible computer-readable storage media storing computer-executable instructions for causing a database system, the database system comprising one or more processing units and a memory, having such instructions in memory and executed on the one or more processing units, to perform operations for facilitating database transaction processing within a database environment, the operations comprising
implementing a query language executor, the query language executor having a first thread pool;
implementing a job executor, the job executor having a second thread pool different than the first thread pool;
at a first time, receiving a first request for a first set of database operations from a first client, the first set of database operations accessing a first set of one or more database tables, the first set of one or more database tables being accessible to the query language executor and the job executor;
executing the first request to provide first query execution results;
during the executing the first request, measuring a first set of execution statistics for the first set of database operations;
at a second time, the second time being after the first time, receiving with a first thread of the query language executor a second request for the first set of database operations from a second client, where the second client is the first client or is a client other than the first client;
determining a first request type for the first set of database operations;
determining that the first request type is an online analytical processing (OLAP) request;
responsive to determining that the first request type is an online analytical processing (OLAP) request:
retrieving first execution statistics defined for the first set of database operations measured during one or more prior executions of the first request, the first execution statistics based at least in part on the first set of execution statistics;
comparing at least some of the first execution statistics with one or more threshold values defined to determine whether the second request should be executed by either the query language executor or the job executor;
determining that the first execution statistics satisfy conditions for executing the second request at the query language executor using the first thread;
initiating execution of the second request with the query language executor to provide second query execution results;
sending the second query execution results to the second client by the first thread;
at a third time, the third time being after, before, or concurrent with the second time, receiving a third request for a second set of database operations from a third client, where the third client is the first client, the second client, or a client other than the first client or the second client, the second set of database operations accessing a second set of one or more database tables, the second set of one or more database tables being accessible to the query language executor and the job executor, wherein the second set of one or more database tables is the first set of one or more database tables or is a set of one or more database tables different than the first set of one or more database tables;
executing the third request to provide third query execution results;
during the executing the third request, measuring a second set of execution statistics for the second set of database operations;
at a fourth time, the fourth time being after the third time, receiving with a second thread of the query language executor, a fourth request for the second set of database operations from a fourth client, where the fourth client is the first client, the second client, the third client, or is a client other than the first client, the second client, or the third client and the second thread is the first thread or a thread other than the first thread;
determining a second request type for the second set of database operations;
determining that the second request type is an online analytical processing (OLAP) request;
responsive to determining that the second request type is an online analytical processing (OLAP) request:
retrieving second execution statistics defined for the second set of database operations measured during one or more prior executions of the second set of database operations, the second execution statistics based at least in part on the second set of execution statistics, wherein the second execution statistics are different than the first execution statistics;
comparing at least some of the second execution statistics with the one or more threshold values defined to determine whether the fourth request should be executed by either the query language executor or the job executor;
determining that the second execution statistics do not satisfy conditions for executing the fourth request at the query language executor;
with the query language executor, delegating the fourth request to the job executor for execution;
in response to delegating the fourth request to the job executor, releasing the second thread, wherein upon release the second thread is available to receive requests from one or more clients;
executing the fourth request with one or more threads of the second thread pool at the job executor to provide fourth query execution results; and
sending the fourth query execution results to the fourth client using a thread of the second thread pool.

15. The one or more tangible computer-readable storage media of claim 14, the operations further comprising:
measuring a third set of execution statistics during execution of the second request.

16. A computer-implemented method comprising:
implementing a query language executor, the query language executor having a first thread pool;
implementing a job executor, the job executor having a second thread pool different than the first thread pool;
at a first time, receiving a first request for a first set of database operations from a first client, the first set of database operations accessing a first set of one or more database tables, the first set of one or more database tables being accessible to the query language executor and the job executor;
executing the first request to provide first query execution results;
during the executing the first request, measuring a first set of execution statistics for the first set of database operations;
at a second time, the second time being after the first time, receiving with a first thread of the query language executor a second request for the first set of database operations from a second client, where the second client is the first client or is a client other than the first client;
determining a first request type for the first set of database operations;
determining that the first request type is an online analytical processing (OLAP) request;
responsive to determining that the first request type is an online analytical processing (OLAP) request:
retrieving first execution statistics defined for the first set of database operations measured during one or more prior executions of the first request, the first execution statistics based at least in part on the first set of execution statistics;
comparing at least some of the first execution statistics with one or more threshold values defined to determine whether the second request should be executed by either the query language executor or the job executor;
determining that the first execution statistics satisfy conditions for executing the second request at the query language executor using the first thread;
initiating execution of the second request with the query language executor to provide second query execution results;
sending the second query execution results to the second client by the first thread;
at a third time, the third time being after, before, or concurrent with the second time, receiving a third request for a second set of database operations from a third client, where the third client is the first client, the second client, or a client other than the first client or the second client, the second set of database operations accessing a second set of one or more database tables, the second set of one or more database tables being accessible to the query language executor and the job executor, wherein the second set of one or more database tables is the first set of one or more database tables or is a set of one or more database tables different than the first set of one or more database tables;
executing the third request to provide third query execution results;
during the executing the third request, measuring a second set of execution statistics for the second set of database operations;
at a fourth time, the fourth time being after the third time, receiving with a second thread of the query language executor, a fourth request for the second set of database operations from a fourth client, where the fourth client is the first client, the second client, the third client, or is a client other than the first client, the second client, or the third client and the second thread is the first thread or a thread other than the first thread;
determining a second request type for the second set of database operations;
determining that the second request type is an online analytical processing (OLAP) request;
responsive to determining that the second request type is an online analytical processing (OLAP) request:
retrieving second execution statistics defined for the second set of database operations measured during one or more prior executions of the second set of database operations, the second execution statistics based at least in part on the second set of execution statistics, wherein the second execution statistics are different than the first execution statistics;
comparing at least some of the second execution statistics with the one or more threshold values defined to determine whether the fourth request should be executed by either the query language executor or the job executor;
determining that the second execution statistics do not satisfy conditions for executing the fourth request at the query language executor;
with the query language executor, delegating the fourth request to the job executor for execution;
in response to delegating the fourth request to the job executor, releasing the second thread, wherein upon release the second thread is available to receive requests from one or more clients;
executing the fourth request with one or more threads of the second thread pool at the job executor to provide fourth query execution results; and
sending the fourth query execution results to the fourth client using a thread of the second thread pool.

17. The method of claim 16, further comprising:
measuring a third set of execution statistics during execution of the second request.

18. The one or more tangible computer-readable storage media of claim 14, the operations further comprising:
receiving a fifth request for one or more database operations from a fifth client, wherein the fifth request is a transaction control request to commit a transaction or to rollback a transaction and where the fifth client is the first client, the second client, the third client, the fourth client, or is a client other than the first client, the second client, the third client, or the fourth client;
causing the fifth request to be executed by the query language executor to provide execution results; and
sending the execution results to the fifth client.

19. The one or more tangible computer-readable storage media of claim 14, the operations further comprising:
assigning an operation of the fourth request to an additional execution thread of the job executor.

20. The computer-implemented method of claim 16, further comprising:

assigning an operation of the fourth request to an additional execution thread of the job executor.

* * * * *